(12) United States Patent
Li et al.

(10) Patent No.: US 9,336,197 B2
(45) Date of Patent: May 10, 2016

(54) LANGUAGE RECOGNITION BASED ON VOCABULARY LISTS

(71) Applicant: Tencent Technology (Shenzhen) Company Limited, Shenzhen (CN)

(72) Inventors: Lu Li, Shenzhen (CN); Qiang Cheng, Shenzhen (CN); Jianxiong Ma, Shenzhen (CN); Feng Rao, Shenzhen (CN); Duling Lu, Shenzhen (CN); Li Lu, Shenzhen (CN); Xiang Zhang, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 360 days.

(21) Appl. No.: 14/108,224

(22) Filed: Dec. 16, 2013

(65) Prior Publication Data

US 2014/0207440 A1 Jul. 24, 2014

Related U.S. Application Data

(63) Continuation of application No. PCT/CN2013/085926, filed on Oct. 25, 2013.

(30) Foreign Application Priority Data

Jan. 22, 2013 (CN) .......................... 2013 1 0022788

(51) Int. Cl.
*G06F 17/28* (2006.01)
*G06F 17/27* (2006.01)

(52) U.S. Cl.
CPC .................................. *G06F 17/2735* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC .......................................................... 704/2–8
See application file for complete search history.

(56) References Cited

U.S. PATENT DOCUMENTS 5,182,708 A * 1/1993 Ejiri .................... G06F 17/2795
704/1
5,371,807 A * 12/1994 Register ............ G06F 17/30707
382/159

(Continued)

FOREIGN PATENT DOCUMENTS

CN 1492354 A 4/2004
CN 101667424 A 3/2010

(Continued)

OTHER PUBLICATIONS

Tencent Technology, ISRWO, PCT/CN2013/085926, Jan. 30, 2014, 7 pgs.

*Primary Examiner* — Lamont Spooner
(74) *Attorney, Agent, or Firm* — Morgan, Lewis & Bockius LLP (57) ABSTRACT

A method is implemented at a computer to determine that certain information content is composed or compiled in a specific language selected among two or more similar languages. The computer integrates a first vocabulary list of a first language and a second vocabulary list of a second language into a comprehensive vocabulary list. The integrating includes analyzing the first vocabulary list in view of the second vocabulary list to identify a first vocabulary sub-list that is used in the first language, but not in the second language. The computer then identifies, in the information content, a plurality of expressions that are included in the comprehensive vocabulary list, and a subset of expressions that are included in the first vocabulary sub-list. Upon a determination that a total frequency of occurrence of the subset of expressions meets predetermined occurrence criteria, the computer determines that the information content is composed in the first language.

20 Claims, 4 Drawing Sheets

100

(56) References Cited

U.S. PATENT DOCUMENTS

| | | | | | |
|---|---|---|---|---|---|
| 5,377,280 | A | * | 12/1994 | Nakayama | G06F 17/275 382/191 |
| 5,392,419 | A | * | 2/1995 | Walton | G06F 17/275 358/1.13 |
| 5,548,507 | A | * | 8/1996 | Martino | G06F 17/275 704/1 |
| 5,913,185 | A | * | 6/1999 | Martino | G06F 17/275 704/10 |
| 6,061,646 | A | | 5/2000 | Martino et al. | |
| 6,167,369 | A | * | 12/2000 | Schulze | G06F 17/277 704/10 |
| 6,216,102 | B1 | * | 4/2001 | Martino | G06F 17/2715 704/1 |
| 6,704,698 | B1 | * | 3/2004 | Paulsen, Jr. | G06F 17/2715 704/1 |
| 7,865,355 | B2 | * | 1/2011 | Xu | G06F 17/275 704/8 |
| 8,224,641 | B2 | * | 7/2012 | Goswami | G06F 17/289 704/1 |
| 8,442,965 | B2 | * | 5/2013 | Lopiano | G06F 17/275 704/8 |
| 8,539,349 | B1 | * | 9/2013 | Kirshenbaum | G06F 17/27 704/10 |
| 8,635,061 | B2 | * | 1/2014 | Li | G06F 17/30864 704/10 |
| 2002/0065857 | A1 | * | 5/2002 | Michalewicz | G06F 17/3071 715/259 |
| 2002/0173945 | A1 | * | 11/2002 | Fabiani | G10L 15/26 704/1 |
| 2004/0102957 | A1 | * | 5/2004 | Levin | G06F 17/2735 704/3 |
| 2004/0122656 | A1 | * | 6/2004 | Abir | G06F 17/2872 704/4 |
| 2007/0288448 | A1 | * | 12/2007 | Datta | G06F 17/2795 |
| 2007/0288450 | A1 | * | 12/2007 | Datta | G06F 17/2217 |
| 2008/0235202 | A1 | * | 9/2008 | Wang | G06F 17/30669 |
| 2008/0300855 | A1 | * | 12/2008 | Alibaig | G10L 13/00 704/3 |
| 2011/0106524 | A1 | * | 5/2011 | Mousaad | G06F 17/21 704/8 |
| 2011/0111774 | A1 | * | 5/2011 | Nyberg | G06F 17/2735 455/466 |
| 2011/0202334 | A1 | * | 8/2011 | Abir | G06F 17/2809 704/4 |

FOREIGN PATENT DOCUMENTS

| | | |
|---|---|---|
| CN | 102323921 A | 1/2012 |
| CN | 102460538 A | 5/2012 |

* cited by examiner

Fig. 4B

LANGUAGE RECOGNITION BASED ON VOCABULARY LISTS

RELATED APPLICATIONS

This application is a continuation application of PCT Patent Application No. PCT/CN2013/085926, entitled "LANGUAGE RECOGNITION BASED ON VOCABULARY LISTS" filed Oct. 25, 2013, which claims priority to Chinese Patent Application No. 201310022788.1, entitled "Language Recognition Based on Vocabulary Lists," filed on Jan. 22, 2013, both of which are incorporated by reference in their entirety.

FIELD OF THE INVENTION

The present application relates to computer-based natural language processing technologies, and particularly, to devices, systems and methods for processing specific information content and recognizing a language in which the information content is composed or compiled.

BACKGROUND OF THE INVENTION

As computation and communication technologies are developed towards a more sophisticated level, the Internet starts to play a vital role in both of our work and private life, and a huge number of software applications have emerged and will continue to emerge on the Internet. Particularly, in accordance with a globalization trend of world economy, the Internet technologies have been significantly improved over the past decade, and the amount of information exchanged on the Internet has dramatically increased. Under this circumstance, it has become a significant challenge to develop software applications to efficiently and promptly extract valid or relevant information from the information that is available on the Internet.

Natural language processing (also called Information Retrieval) refers to a process to organize the available information and capture the relevant information therein based on certain user requirements. In some particular situations, natural language processing is focused on the process of capturing the relevant information from the information, organized or not, and this particular process is sometimes called as an Information Search process or an Information Seek process.

Different natural language processing methods are applied to process certain information content that is organized in a certain format. For example, a typical method searches for literature data in the information content using conventional retrieving tools based on bibliography, abstract and/or index. Unique nature, characteristics and process of each retrieving tool allow the information search to be conducted from different perspectives. As a specific example, the information search may be implemented in either a chronological order or a reverse chronological order. The information search in the chronological order are sometimes costly with a low efficiency, while the information search in the reverse chronological order processes more recent information with a priority, oftentimes leading to better search performances and search results. Other than the typical method described herein, a retrospective method is also applied to process some information content. Information search in the retrospective method is highly targeted, because this method is focused on tracing and searching for the references given by the existing bibliography.

One particular natural language processing field is concerned with recognition of languages that are applied to compose and/or compile specific information content. Language recognition can become a significant challenge, when two or more similar languages (such as Cantonese and Mandarin, Southern Fujian Dialect and Mandarin, etc.) are possibly used. These similar languages generally share certain amount of common vocabularies that make it difficult for machines to distinguish which one or more languages among these similar languages are specifically adopted to compose the relevant information content. For example, there are many words that are used in both Cantonese and Mandarin, so it is difficult to compile a pure Cantonese vocabulary list. In particular, as the cultures of Hong Kong and Taiwan continuously are disseminated to that of the mainland China, Mandarin Chinese borrows many Cantonese vocabularies, which further blurs the difference between these two languages and causes many errors in identifying the information content that is compiled in either Mandarin Chinese or Cantonese.

SUMMARY

In one aspect, a computer-implemented method of recognizing a first language used in information content includes, at a computer system having one or more processors and memory for storing programs to be executed by the one or more processors, integrating a first vocabulary list and a second vocabulary list that are built based on a first language and a second language, respectively, into a comprehensive vocabulary list. The integrating includes analyzing the first vocabulary list in view of the second vocabulary list to at least identify a first vocabulary sub-list, in the comprehensive vocabulary list, that is used in the first language, but not in the second language. The method further includes identifying, within the information content, a plurality of expressions that are included in the comprehensive vocabulary list; identifying, within the plurality of expressions, a subset of expressions that are included in the first vocabulary sub-list; determining that a total frequency of occurrence of the subset of expressions within the information content meets predetermined occurrence criteria; and in accordance with the determination, determining that the information content is composed in the first language.

In another aspect of the invention, a computer system includes one or more processors and memory having instructions stored thereon, which when executed by the one or more processors cause the processors to integrate a first vocabulary list and a second vocabulary list that are built based on a first language and a second language, respectively, into a comprehensive vocabulary list, wherein the integrating includes analyzing the first vocabulary list in view of the second vocabulary list to at least identify a first vocabulary sub-list, in the comprehensive vocabulary list, that is used in the first language, but not in the second language; to identify, within the information content, a plurality of expressions that are included in the comprehensive vocabulary list; to identify, within the plurality of expressions, a subset of expressions that are included in the first vocabulary sub-list; to determine that a total frequency of occurrence of the subset of expressions within the information content meets predetermined occurrence criteria; and in accordance with the determination, to determine that the information content is composed in the first language.

In another aspect of the invention, a non-transitory computer-readable medium, having instructions stored thereon, which when executed by one or more processors cause the processors of a computation machine to integrate a first vocabulary list and a second vocabulary list that are built based on a first language and a second language, respectively, into a comprehensive vocabulary list, wherein the integrating includes analyzing the first vocabulary list in view of the second vocabulary list to at least identify a first vocabulary sub-list, in the comprehensive vocabulary list, that is used in the first language, but not in the second language; to identify, within the information content, a plurality of expressions that are included in the comprehensive vocabulary list; to identify, within the plurality of expressions, a subset of expressions that are included in the first vocabulary sub-list; to determine that a total frequency of occurrence of the subset of expressions within the information content meets predetermined occurrence criteria; and in accordance with the determination, to determine that the information content is composed in the first language.

Other embodiments and advantages may be apparent to those skilled in the art in light of the descriptions and drawings in this specification.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make a clearer understanding of purpose, technical scheme and advantages of the present application, the present application is described in detail below in combination with the attached drawings.

In accordance with various embodiments of the present application, vocabulary lists are generated for similar languages and integrated into a comprehensive vocabulary list. Based on the comprehensive vocabulary list, a computer system described herein identifies expressions in certain information content received at the system, and analyzes the identified expressions to determine that one of the similar languages is used to compose the information content. During the language recognition process, the expressions that are shared in the similar languages may be conveniently tracked based on the first, second and comprehensive vocabulary lists, and therefore, the respective vocabulary list for each individual language may be generated independently without specifically accounting for the shared expressions. Accordingly, the difficulty is conveniently overcome for generating and controlling a vocabulary list for each individual language in the similar languages, and moreover, the accuracy of language recognition may even be improved for the information content that is composed in any of the similar languages.

Figure 1:
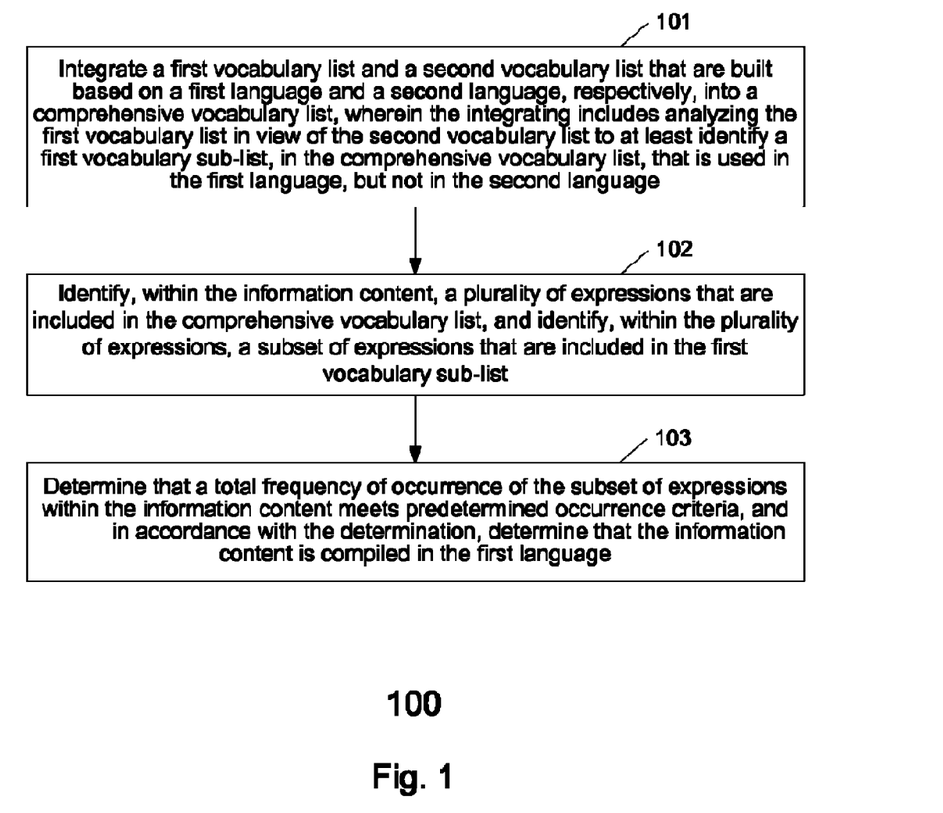
FIG. 1 illustrates a flow chart of an exemplary computer-implemented method 100 for recognizing a language that is used to compose or compile certain information content according to some embodiments in the invention.

FIG. 1 illustrates a flow chart of an exemplary computer-implemented method 100 for recognizing a language that is used to compose or compile certain information content according to some embodiments in the invention. Method 100 is performed at a computer system that has one or more processors and memory for storing programs to be executed by the one or more processors. Each of the operations shown in FIG. 1 may correspond to instructions stored in the memory or a non-transitory computer readable storage medium. The computer readable storage medium may further include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

Method 100 is particularly used to determine whether a first language is applied in the information content in view of a second language. The first language and the second language are associated with a first vocabulary list and a second vocabulary list, respectively, and each vocabulary list contains a list of expressions that are used in the respective language for the purpose of communication. The first vocabulary list and the second vocabulary list are integrated (101) into a comprehensive vocabulary list. The integrating includes (101) analyzing the first vocabulary list in view of the second vocabulary list to at least identify a first vocabulary sub-list in the comprehensive vocabulary list. Each expression included in the first vocabulary sub-list is used in the first language, but not in the second language.

Under many circumstances, the first language and the second language are substantially similar and share some common vocabularies. For example, the first and second languages are two distinct Chinese dialects, and particularly, two languages selected from a language group that consists of Mandarin, Wu (e.g., Shanghainese), Yue (e.g., Cantonese), and Min (e.g., Southern Min). Alternatively, in some embodiments, the first and second languages are two distinct languages selected from a language group that consists of American English, British English and Australian English. One of those skilled in the art knows that the aforementioned languages are merely examples of the first and second languages, and that the first and second languages could be any other similar languages.

In some implementations, the first and second vocabulary lists are obtained by automatic extraction from test information content that is composed in the first and languages, respectively. Optionally, the respective vocabulary list is statistically extracted. Optionally, the respective vocabulary list is determined according to a set of predefined rules. In some embodiments, manual proofreading is involved to improve the qualities of the first vocabulary list and the second vocabulary list. More details on an exemplary method to build a first or second vocabulary list are explained below with reference to FIG. 2.

In accordance with some embodiments in the invention, the information content is organized according to a certain format, and in one specific example, includes a sentence or a paragraph that further includes a plurality of expressions. In some situations related to linguistics, the information content is also called as a corpus or text corpus that normally refers to a large and structured set of texts, and particularly, to electronically stored and processed texts. The information content may come from a variety of sources, such as articles published on the Internet, blog posts, textbooks, newspaper, magazines, posts and comments posted on the social network, and other electronic information.

After integrating the first and second vocabulary lists to the comprehensive vocabulary list, a plurality of expressions that are included in the comprehensive vocabulary list are identified (102) within the information content. In addition, a subset of expressions that are included in a first vocabulary sub-list are identified (102) within the plurality of expressions. As described above, each expression in the first vocabulary sub-list is uniquely used in the first language, but not in the second language; therefore, in some embodiments, each expression in the subset of expressions is included solely in the first vocabulary list associated with the first language, but not in the second vocabulary list.

In many embodiments, an expression is associated with a word or a phrase. In some embodiments when a Chinese dialect is involved, the expression further includes one or more Chinese characters. Alternatively, in other embodiments, the expression is made from a plurality of alphabetic letters and constitutes a word or a phrase that is separated from another word by a space or a punctuation mark.

Because the comprehensive vocabulary list is obtained from integration of the first and second vocabulary lists, the number of expressions in the comprehensive vocabulary list is more than the respective number of expressions in either of the first and second vocabulary lists. When the expression only appears in the first vocabulary list and not in the second vocabulary list, the expression is considered as a special term used in the first language, and therefore, included in the first vocabulary sub-list of the comprehensive vocabulary list.

In some embodiments, particularly for many Chinese dialects, identifying the plurality of expressions within the information content further comprises segmenting the information content into the plurality of expressions according to the comprehensive vocabulary list. In many embodiments, the expressions correspond to words included in the information content, and therefore, the above segmenting operation is also called as word segmentation. In accordance with the word segmentation, special terms of the first language are further determined as the subset of expressions that are included in the first vocabulary sub-list, when such special terms specifically belong to the first vocabulary list, but not to the second vocabulary list. For example, "dinggai" (e.g., "点解" in Chinese characters) is such a special term that is used in Cantonese and not in Mandarin.

Furthermore, in some implementations, a specific word segmentation method is adopted to identify the plurality of expressions based on the comprehensive vocabulary list in operation 102. As a specific example, the word segmentation method is based on a the backward maximum matching algorithm, and the method further includes operations of: (1) providing the comprehensive vocabulary list, in which the maximum length of the expressions in the comprehensive vocabulary list is represented by a variable, max; (2) reading specific information content, such as a sentence S, that includes an integer number, n, of characters; (3) suppose I is a temporary integer variable that has an initial value of max; (4) extracting an expression that contains I consecutive characters and uses the nth character as the last character in the expression, and determining whether the comprehensive vocabulary list contains the expression, and (5) if the expression exists in the comprehensive vocabulary list, determining the expression as one of the plurality of expressions that are identified according to operation 102, and (6) continuing to execute step (4) by using the (n−1)th character as the last character in the expression, until the first character in the sentence is included in the expression. In accordance with the specific word segmentation method, steps (4)-(6) are repeated when the integer, I, is successively reduced from max to 1.

Alternatively, in some implementations, the word segmentation method adopted to identify the plurality of expressions in operation 102 involves a minimum word segmentation algorithm, a probability-based model or some predetermined segmentation rules.

After identifying the plurality of expressions and the subset of expressions, it is determined (103) that a total frequency of occurrence of the subset of expressions within the information content meets predetermined occurrence criteria. Further in accordance with the determination, the information content is determined (103) to be compiled in the first language. In some implementations, in accordance with the predetermined occurrence criteria, an occurrence threshold value is specified. The total frequency of occurrence of the subset expressions has to exceed the occurrence threshold value to determine that the first language is applied to compose or compile the information content. As a specific example, the occurrence threshold value is set as 30 in a paragraph of information content that contains more than 100 words, which means 30 expressions that belong to the first vocabulary sub-list have to be identified in the paragraph for a positive determination that the first language is used to construct this paragraph.

In many implementations, the predetermined occurrence criteria are set according to at least one parameter selected from the number of expressions in the subset of expressions, a first ratio between the number of words in the subset of expressions and the total number of words in the information content, and a second ratio between the number of words in the subset of expressions and the number of words in another subset of expressions, included in the information content, that are defined as valid expressions. In some situations involving a Chinese dialect, the valid expressions refer to the expressions generated from Chinese characters, alphabetic letters and/or Arabic numbers, and do not include the punctuation marks (e.g., period, question mark, exclamation mark, comma, semicolon, colon, quotation mark, bracket, dash, hyphen, ellipsis, dash, space, slash, arrow, etc.).

As shown above, in one example, the total frequency of occurrence for the subset of expression is determined to meet the predetermined occurrence criteria, when the number of expressions in the subset of expressions exceeds the occurrence threshold value. In other examples, the total frequency of occurrence for the subset of expression is determined to meet the predetermined occurrence criteria, when the first ratio exceeds a first predetermined threshold ratio, or when the second ratio exceeds a second predetermined threshold ratio.

In some situations, the predetermined occurrence criteria are based on all of these three parameters, including the number of expressions in the subset of expressions, the first ratio and the second ratio. Specifically, the number of expressions in the subset of expressions is represented as yy_count, and the first ratio and the second ratio are represented by ratio and valid_ratio, respectively. Therefore, $$\text{ratio} = \frac{yy\_count}{N} \quad (1)$$

$$\text{valid\_ratio} = \frac{yy\_count}{valid\_N} \quad (2)$$

where N is the number of expressions in the information content, and valid N is the number of the valid expressions in the information content. In particular, operation 103 further includes computing the number of expressions in the subset of expression that are specifically associated with the first language, the first ratio between the number of words in the subset of expressions and the total number of words in the information content, and the second ratio between the number of words in the subset of expressions and the number of words in another subset of expressions, included in the information content, that are defined as valid expressions. A weighted sum is calculated from the number of words in the subset of expressions, the first ratio and the second ratio, and compared to a comprehensive threshold value for the purposes of determining that the predetermined occurrence criteria are satisfied.

It should be understood that the particular order in which the operations in FIG. 1 have been described are merely exemplary and are not intended to indicate that the described order is the only order in which the operations could be performed. One of those having ordinary skill in the art would recognize various ways to recognize the language applied to compose and/or compile the information content as described herein. Additionally, it should be noted that details of other processes described herein with respect to other methods (e.g., FIGS. 2 and 3) are also applicable in an analogous manner to method 100 described above with respect to FIG. 1. For brevity, these details are not repeated here.

In some situations, the second vocabulary list is also analyzed in view of the first vocabulary list to identify a second vocabulary sub-list that is included in the comprehensive vocabulary list. The expressions in the second vocabulary sub-list are composed in the second language, and do not involve the first language. In addition to the subset of expressions (referred to as the first subset of expressions herein), the plurality of expressions identified in the information content further include a second subset of expressions, and the second subset of expressions are specifically associated with the second language and included in the second vocabulary sub-list. In addition to the total frequency of occurrence (referred to as a first frequency of occurrence herein), a second frequency of occurrence is determined for the second subset of expressions in the information content. The first and second frequencies of occurrence are compared to determine a primary language that is used by the information content. Specifically, in one example, when the first frequency of occurrence is larger than the second frequency of occurrence, the first language is determined as the primary language in which the information content is compiled.

Alternatively, in other situations, both the first vocabulary list and the second vocabulary list are analyzed to identify a first vocabulary sub-list, a mixed vocabulary sub-list and a second vocabulary sub-list in the comprehensive vocabulary list. While the second vocabulary sub-list is similarly associated with expressions used in the second languages but not in the first language, the mixed vocabulary sub-list includes expressions that are used in both the first and second languages. In addition to the first and second frequencies of occurrence as shown in the previous situations, a mixed frequency of occurrence is determined in the information content for the mixed vocabulary sub-list. The primary language used by the information content is determined in view of the first, second and mixed frequencies of occurrence. In one specific example, to determine that the first language is the primary language used in the information content, the first frequency of occurrence has to be larger than a sum of the mixed frequency of occurrence and the second frequency of occurrence.

Figure 2:
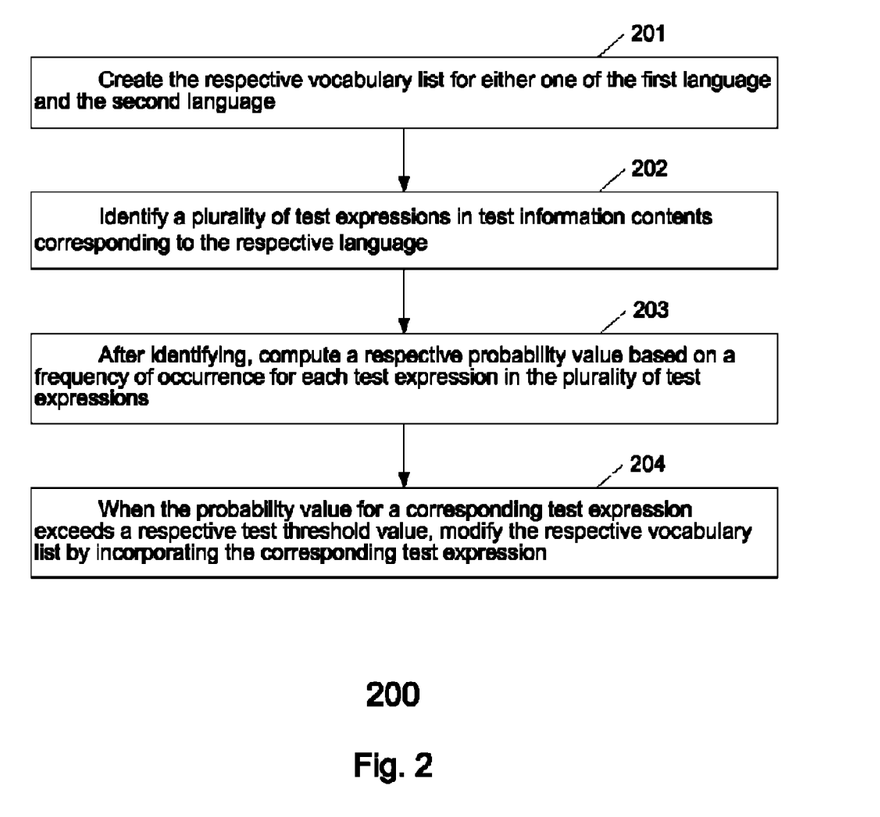
FIG. 2 illustrates a flow chart of an exemplary computer-implemented method of building a vocabulary list for a specific language according to some embodiments in the invention.

FIG. 2 illustrates a flow chart of an exemplary computer-implemented method 200 of building a vocabulary list for a specific language according to some embodiments in the invention. Method 200 is performed at a computer system that has one or more processors that execute programs associated with the operations shown in FIG. 2. Each of the operations may correspond to instructions stored in the memory or a non-transitory computer readable storage medium. The computer readable storage medium may further include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

Method 200 is performed to build the first vocabulary list or the second vocabulary list for the first language or the second language, respectively. The respective vocabulary list is initially created (201) for either one of the first and second languages. Test information content that is composed or compiled in the respective language are further applied to build the respective vocabulary list, and specifically, a plurality of test expressions are identified (202) in the test information content. In some embodiments, a test expression is an individual Chinese character. In some embodiments, a test expression includes more than one Chinese characters that are semantically grouped together to form a specific word or phrase. Similarly, in some embodiments, a test expression is one word in a language of English; in other embodiments, a test expression includes more than one words that are semantically grouped together to form a phrase in the language of English. When the test expression includes more than one word, the more than one word appears together as the phrase in the test information content.

After the identifying, a respective probability value is computed (203) for each of the plurality of test expressions based on a corresponding frequency of occurrence. When the probability value of a corresponding test expression exceeds a respective test threshold value, the respective vocabulary list for the first or second language is modified (204) by incorporating the corresponding test expression.

In some embodiments, a test expression is associated with a correlation value, a plurality of left entropy values and plurality of right entropy values. The correlation value represents mutual information dependence among basic elements included in the test expression. Sometimes, the correlation value is also called as self-information. Furthermore, in a simplest example in which a test expression includes only two basic elements (e.g., characters or words), different left elements may be placed on the left position of the test expression to couple to the right element in the test expression, and therefore, a left entropy value is computed to account for a probability of coupling a certain element, among the different left elements, on the left of the test expression. Similarly, different right elements may be placed on the right position of the test expression to couple to the left element in the test expression, and therefore, a respective right entropy value is computed to account for a probability of coupling a certain element, among the different right elements, on the right of the test expression. In some situations, elements coupled on the left of a test expression are never coupled on the right of the same test expression; however, in other situations, some elements that is coupled on the left may be coupled on the right of a test expression in another context.

In some implementations, during the course of determining whether a specific test expression shall be incorporated in the respective vocabulary list in operation 204, the probability value for the test expression is computed by summing up the correlation value, the plurality of left entropy values and the plurality of right entropy values in a weighted manner. One of those skilled in the art will recognize that adoption of a weighted probability value for each test expression improves both the accuracy of identifying the test expression and the relevance of the corresponding vocabulary list to the particular language.

As a specific example, a and b represent two elements (e.g., character or word) in a Chinese dialect, e.g. Mandarin or Cantonese, and a combination of a and b forms a test expression therein. The probability of obtaining the specific test expression is represented as:

$$\text{Score}(a,b) = \alpha \times I(a,b) + \beta \times Ent(a,b|\text{Left}) + \gamma \times Ent(a,b|\text{Right}) \quad (3)$$

where I(a, b) is the correlation value, Ent(a, b Left) is a comprehensive left entropy value, Ent(a,b|Right) is a comprehensive right entropy value, and α, β, and γ are coefficients for summing up I(a, b), Ent(a,b|Left) and Ent(a,b|Right) in the weighted manner. In some embodiments, correlation value I(a, b) is further represented as a function of a plurality of frequencies of occurrence:

$$I(a, b) = \frac{C(a, b)}{C(a)C(b)} \quad (4)$$

where C(a,b), C(a) and C(b) are the frequencies of occurrence for the specific test expression, element a and element b, respectively. Furthermore, in some embodiments, Ent(a, b|Left) and Ent(a,b|Right) are represented as:

$$Ent(a,b|\text{Left}) = \Sigma_{k \in L(a,b)} p(k) \log [p(k)] \quad (5)$$

$$Ent(a,b|\text{Right}) = \Sigma_{k \in R(a,b)} p(k) \log [p(k)] \quad (6)$$

where L(a,b) and R(a,b) represent collections of all the elements that could appear on the left and the right of the specific test expression in the test information content, respectively, k represents an element in collection L(a,b) or R(a,b), and p(k) represents a probability of expression k in the test information content.

In some implementations, the test information content is adopted from various information resources in a bibliography, such as articles on the Internet, blog posts, textbooks, newspaper, magazines, posts and comments posted on the social network, and other electronic information compiled in the corresponding language. Under some circumstances, the test information content include all texts in a complete article, while under other circumstances, the test information content is merely a collection of discrete phrases and short sentences. When an article is used as the test information content, there is no word count requirement imposed on the article that is used as the test information content, as long as the article includes a collection of letters, characters, words, phrases and/or sentences that are semantically arranged to express certain meaning.

In certain preferred implementations, a dictionary of a respective language is used to provide the test information content that the respective vocabulary list of the first or second language is initially created from. In some implementations, the test information content is selected according to their relevance to information content that need to be processed. For example, the information content that needs to be processed will be mainly contents adopted from posts and comments in a social network application, and therefore, the test information content is a collection of typical posts and comments in the social network application.

It should be understood that the particular order in which the operations in FIG. 2 have been described are merely exemplary and are not intended to indicate that the described order is the only order in which the operations could be performed. One of ordinary skill in the art would recognize various ways to build a vocabulary list for use to recognize a language in which certain information content is composed and/or compiled. Additionally, it should be noted that details of other processes described herein with respect to other methods (e.g., FIGS. 1 and 3) are also applicable in an analogous manner to method 200 described above with respect to FIG. 2. For brevity, these details are not repeated here.

Figure 3:
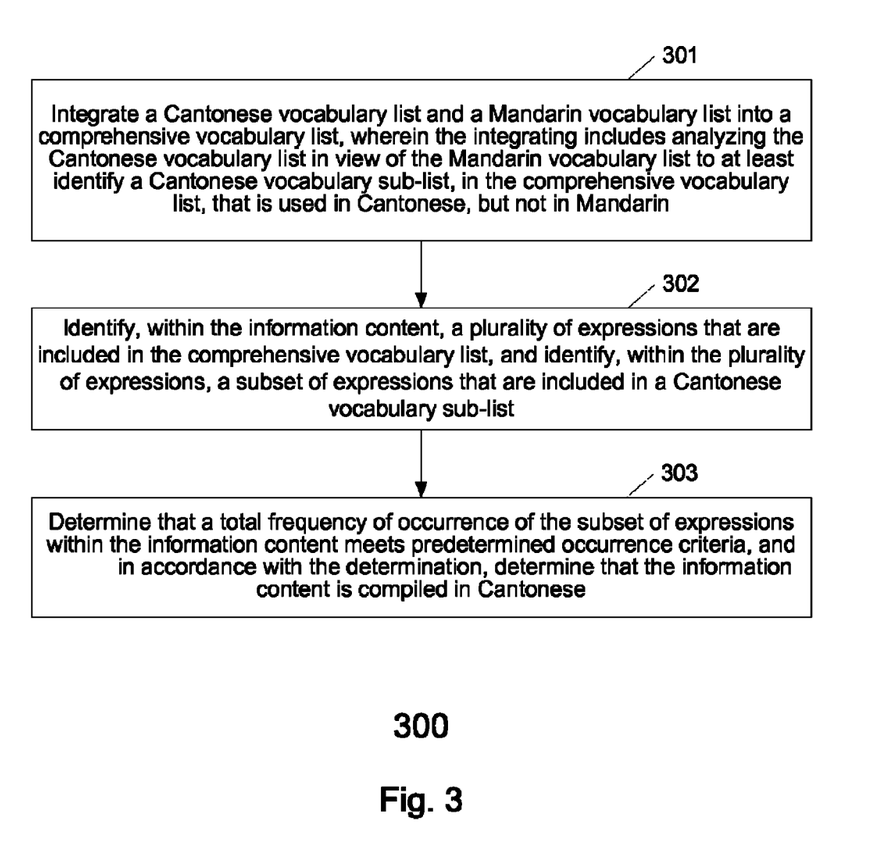
FIG. 3 illustrates a flow chart of an exemplary computer-implemented method of recognizing Cantonese that is used to compose or compile certain information content according to some embodiments in the invention.

FIG. 3 illustrates a flow chart of an exemplary computer-implemented method 300 of recognizing Cantonese that is used to compose or compile certain information content according to some embodiments. In particular, Cantonese is recognized in the information content in view of another language, e.g, Mandarin. Cantonese and Mandarin are two commonly used Chinese dialects and share many common vocabularies. Like methods 100 and 200, method 300 is performed at a computer system that has one or more processors that execute programs associated with the operations shown in FIG. 3. Each of the operations may correspond to instructions stored in the memory or a non-transitory computer readable storage medium. The computer readable storage medium may further include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100 may be combined and/or the order of some operations may be changed.

Method 300 is particularly used to determine whether Cantonese is applied in the information content in view of Mandarin. Cantonese and Mandarin are associated with a Cantonese vocabulary list and a Mandarin vocabulary list, respectively, and each vocabulary list contains a list of expressions that are used in the respective language for the purpose of communication. The Cantonese vocabulary list and the Mandarin vocabulary list are integrated (301) into a comprehensive vocabulary list. The integrating includes (301) analyzing the Cantonese vocabulary list in view of the Mandarin vocabulary list to at least identify a Cantonese vocabulary sub-list in the comprehensive vocabulary list. Each expression included in the Cantonese vocabulary sub-list is used in Cantonese, but not in Mandarin.

After integrating the Cantonese and Mandarin vocabulary lists to the comprehensive vocabulary list, a plurality of expressions that are included in the comprehensive vocabulary list are identified (302) within the information content. In addition, a subset of Cantonese expressions that are included in a Cantonese vocabulary sub-list are identified (302) within the plurality of expressions. As described above, each expression in the Cantonese vocabulary sub-list is uniquely used in the Cantonese language, but not in the Mandarin language; therefore, in some embodiments, each expression in the subset of Cantonese expressions is included solely in the Cantonese vocabulary list associated with Cantonese, but not in the Mandarin vocabulary list.

After identifying the plurality of expressions and the subset of Cantonese expressions, it is determined (303) that a total frequency of occurrence of the subset of Cantonese expressions within the information content meets predetermined occurrence criteria. Further in accordance with the determination, the information content is determined (303) to be composed or compiled in Cantonese. In some implementations, in accordance with the predetermined occurrence criteria, an occurrence threshold value is specified. The total frequency of occurrence of the subset Cantonese expressions has to exceed the occurrence threshold value to determine that Cantonese is applied to compose or compile the information content.

It is noted that in many embodiments, a unique language attribute (e.g., whether an expression is used in Cantonese but not in Mandarin) is applied to identify a vocabulary sub-list for a certain language. Specifically, in this situation, unlike some prior art that relies on the Cantonese vocabulary list that may contain some Mandarin expressions, method 300 identifies the Cantonese expressions that are only used in Cantonese and never in Mandarin, and does not take into consideration of Cantonese expressions that are also used in Mandarin contents at all. The resulting total frequency of occurrence of Cantonese expressions is better tailored to quantitatively represent the weight of the Cantonese language in the information content. Most important of all, when a fair number of Cantonese expressions that can also be used in Mandarin contexts are applied in the information content in such a context, the chance of erroneously recognizing Cantonese as the applied language is reduced. Therefore, the accuracy of language recognition is improved when the language used to compose the information content needs to be determined between these two similar languages.

Figure 4A:
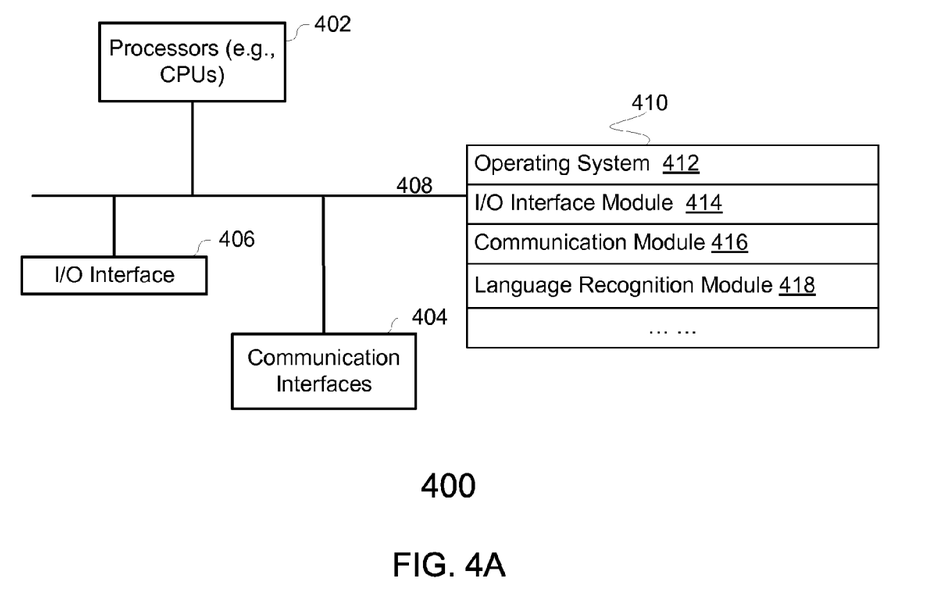
FIG. 4A illustrates a block diagram of a computer system according to some embodiments in the invention.

FIG. 4A illustrates a block diagram of a computer system 400 according to some embodiments in the invention. Computer system 400 typically includes one or more processing units 430 (sometimes called CPUs or processors) for executing programs (e.g., programs stored in memory 410), one or more communication interfaces 404, memory 410, an input/output (I/O) interface 406 (e.g., touch screen, keypads, camera, display screen), and one or more communication buses 408 for interconnecting these components. Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 430. Memory 410, or alternately the non-volatile memory device(s) within memory 410, includes a non-transitory computer readable storage medium. In some embodiments, memory 410 or the computer readable storage medium of memory 410 stores the following programs, modules and data structures, or a subset thereof:

- an operating system 412 that includes procedures for handling various basic system services and for performing hardware dependent tasks;
- a communication module 414 that is used for coupling computer system 400 to other devices via the one or more communication interfaces 404 (wired or wireless) and one or more communication networks, such as the Internet, other wide area networks, local area networks, metropolitan area networks, and so on;
- an optional I/O interface module 416 that receives commands from the user via input devices and generates user interface objects in the display device; and
- a language recognition module 418 that includes a specific program, including instructions, which are executed to recognize a specific language applied to compose or compile certain information content received at computer system 400. More details concerning the method of recognizing the specific language in view of another similar language are explained above with reference to FIGS. 1-3.

Figure 4B:
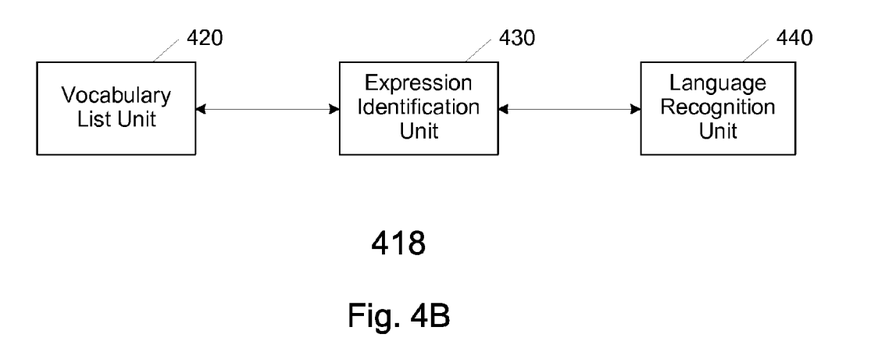
FIG. 4B illustrates a block diagram of a language recognition system that is organized based on instructions in the language recognition module according to some embodiments in the invention.

FIG. 4B illustrates a block diagram of a language recognition system that is organized based on instructions in the language recognition module 418 according to some embodiments in the invention. The language recognition system includes a vocabulary list unit 420, an expression identification unit 430 and a language recognition unit 440. In some implementations, units 420, 430 and 440 are applied to implement operations 101, 102 and 103 in language recognition method 100, respectively.

Vocabulary list unit 420 is configured to establish a first vocabulary list and a second vocabulary list for a first language and a second language, respectively, and then, integrate the first vocabulary list and the second vocabulary list to a comprehensive vocabulary list. Given both the first and second vocabulary lists, the vocabulary list unit 420 further analyzes the first vocabulary list with reference to the second vocabulary list, and at least identifies a first vocabulary sub-list that contains expressions used in the first language, but not in the second language. Similarly in accordance with the analyzing, in some implementations, the vocabulary list unit 420 identifies a second vocabulary sub-list that contains expressions used in the second language, but not in the first language. In some other implementations, in accordance with the analyzing, the vocabulary list unit 420 further identifies a mixed vocabulary sub-lit that contains expressions shared by both the first language and the second language.

In some implementations, the vocabulary list unit 420 relies on respective test information content associated with the first language and the second language to build the first vocabulary list and the second vocabulary list, respectively. A plurality of test expressions are identified in the respective test information content for the first or second vocabulary list. In some embodiments, the identifying of the test expressions are based on an operation of segmenting the test information content to individual Chinese characters, words and/or phrases that are identified as test expressions. A respective probability value is then computed for forming each test expression based on a corresponding frequency of occurrence. When the respective probability value for each test expression exceeds a respective test threshold value, the respective vocabulary list is modified to incorporate the respective test expression. More details of establishing a vocabulary list are explained above with reference to FIG. 2.

As described above to explain FIG. 2, in some situations, whether the respective test expression is incorporated into the corresponding vocabulary list is determined by summing up a correlation value, a plurality of left entropy values and a plurality of right entropy values in a weighted manner. More details of computing the weighted summation result are presented above with reference to FIG. 2 and Equations (3)-(6).

Expression identification unit 430 identifies a plurality of expressions within received information content according to the comprehensive vocabulary list, and thus, the identified expressions can be found in the comprehensive vocabulary list. Furthermore, Expression identification unit 430 identifies a subset of expressions in the plurality of expressions, and the subset of expressions are particularly included in the first vocabulary sub-list that includes expressions associated with the first language but not the second language. Under some circumstances, the expressions in the first vocabulary sub-list refer to specific terms of the first language. In some specific embodiments, in accordance with the identifying operation, expression identification unit 430 conducts word segmentation on the received information content based on the comprehensive vocabulary list to identify special terms of the first language in the received information content.

In accordance with the identified subset of expressions associated with the first vocabulary sub-list, language recognition unit 440 determines whether a total frequency of occurrence for the expressions in the subset of expressions within the information content meets predetermined occurrence criteria. Based on a positive determination, the language recognition unit 440 further determines that the information content is composed or compiled in the first language. According to some embodiments of the predetermined occurrence criteria, the total frequency of occurrence has to exceed a predetermined occurrence threshold value in order to reach a positive determination that the first language is adopted to compose or compile the information content. More examples of the predetermined occurrence criteria are discussed above with reference to FIG. 1, and some of the examples involves at least one parameter selected from the number of words in the subset of expressions, a first ratio between the number of words in the subset of expressions and the total number of words in the information content, and a second ratio between the number of words in the subset of expressions and the number of words in another subset of expressions, included in the information content, that is defined as valid vocabularies.

In some implementations, expression identification unit 430 also analyzes the second vocabulary list in view of the first vocabulary list to identify a second vocabulary sub-list that is included in the comprehensive vocabulary. The expressions in the second vocabulary sub-list are composed in the second language, and do not involve the first language. In addition to the subset of expressions (referred to as the first subset of expressions herein), express identification unit 430 determines that the plurality of expressions identified in the information content further include a second subset of expressions. The second subset of expressions are specifically associated with the second language and included in the second vocabulary sub-list. In addition to the total frequency of occurrence (referred to as a first frequency of occurrence herein), language recognition unit 440 determines a second frequency of occurrence for the second subset of expressions in the information content, and compares the first and second frequencies of occurrence to determine a primary language that is used by the information content.

Alternatively, in other implementations, expression identification unit 430 analyzes the first vocabulary list and the second vocabulary list in view of each other, and identifies a first vocabulary sub-list, a mixed vocabulary sub-list and a second vocabulary sub-list in the comprehensive vocabulary list. The second vocabulary sub-list is similarly associated with expressions used in the second languages but not in the first language, and the mixed vocabulary sub-list includes expressions that are used in both the first and second languages. In addition to the first and second frequencies of occurrence as shown in the previous implementations, language recognition unit 440 determines a mixed frequency of occurrence in the information content for the mixed vocabulary sub-list. Language recognition unit 440 further determines the primary language used by the information content based on the first, second and mixed frequencies of occurrence.

In some embodiments, computer system 400 that integrates the language recognition system 450 is a conventional device, e.g., a cellular phone (including a smart phone), a personal digital assistance (PDA) device, a tablet computer, a laptop computer, and a desktop computer. In particular, software programs that include instructions for language recognition are installed on respective computer machine 400 to configure the machine to recognize a specific language according to the language recognition methods disclosed herein.

Under some circumstances, the software programs that include instructions for language recognition are installed on computer system 400 as a standalone application. The installation is oftentimes initialized upon a request by a user of computer system 400. However, under many other circumstances, such software programs for language recognition are integrated as plug-ins in a natural language processing software package that is associated with a remote server dedicated to processing natural languages. In some embodiments, when configured as plug-ins, the software programs are implemented in a certain plug-in format, e.g., ocx, dll, and cab, and specifically, as Flash plug-ins, RealPlayer plug-ins, MMS plug-ins, MI stave plug-ins or ActiveX plug-ins.

In some situations, memory 410, or alternately the non-volatile memory device(s) within memory 410, that stores instructions or instruction set are implemented in various storage media in which the language recognition methods mentioned in the embodiment of the present application can be stored. These storage media include but not limited to: floppy disk, CD, DVD, hard disk, NAND flash, USB flash disk, CF card, SD card, MMC card, SM card, Memory Stick (Memory Stick), xD card, etc. In some other situations, the language recognition methods mentioned in the embodiment of the present application are stored in storage medium based on NAND flash, e.g., USB flash disk, CF card, SD card, SDHC card, MMC card, SM card, Memory Stick, and xD card.

During the course of recognizing the language used to compose information content, it is essential to differentiate the expressions used specifically in the first language and the expressions used in both the first and second languages. When plenty of the latter expressions are included in the information content, a simple language recognition method that does not differentiate these two kinds of expressions will erroneously result in a determination that the first language is applied to compose the information content, even though these latter expressions could originate from the second language. To address this problem, the present application determines the applied language in the information content according to a separate vocabulary sub-list, i.e., the first vocabulary sub-list, which is specifically associated with the first language and not with the second language.

In addition, given the separate vocabulary sub-list, the respectively vocabulary list is able to be conveniently maintained for each individual language without regard to whether the corresponding expressions are also used in the other similar languages. Most importantly, the accuracy of language recognition is not compromised for such language recognition among two or more similar languages.

While particular embodiments are described above, one of those skilled in the art will understand that the particular embodiments are not intended to limit the invention. On the contrary, the invention includes alternatives, modifications and equivalents that are within the scope of the appended claims. Moreover, specific details are discussed above in order to provide a thorough understanding of the subject matter presented herein. It is obvious to one of ordinary skill in the art that the subject matter may be practiced without these specific details. In other instances, methods, procedures, components, and circuits that are known by those people having ordinary skill in the art have not been described in detail, so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of recognizing a first language used in information content, comprising:
   at a computer having one or more processors and memory for storing programs to be executed by the one or more processors:
      integrating a first vocabulary list and a second vocabulary list that are built based on a first language and a second language, respectively, into a comprehensive vocabulary list, wherein the integrating includes analyzing the first vocabulary list in view of the second vocabulary list to at least identify a first vocabulary sub-list, in the comprehensive vocabulary list, that is used in the first language, but not in the second language;
      identifying, within the information content, a plurality of expressions that are included in the comprehensive vocabulary list;
      identifying, within the plurality of expressions, a subset of expressions that are included in the first vocabulary sub-list;
      determining that a total frequency of occurrence of the subset of expressions within the information content meets predetermined occurrence criteria; and
      in accordance with the determination, determining that the information content is composed in the first language.

2. The method of claim 1, wherein building the first vocabulary list and the second vocabulary list, further comprising:
   creating the respective vocabulary list for either one of the first language and the second language;
   identifying a plurality of test expressions in test information content corresponding to the respective language;
   after identifying, computing a respective probability value based on a frequency of occurrence for each of the plurality of test expressions; and
   when the respective probability value for each test expression exceeds a respective test threshold value, modifying the respective vocabulary list by incorporating the respective test expression.

3. The method of claim 2, wherein computing a respective probability value based on a frequency of occurrence for each of the plurality of test expressions, further comprising:
   determining a correlation value, a plurality of left entropy values and a plurality of right entropy values for the respective test expression in the plurality of test words, the correlation value being related to mutual information dependence among words in the respective test expression, each of the plurality of right entropy values being associated with a probability of coupling a respective right expression, in the respective language, to the right of the respective test expression, each of the plurality of left entropy values being associated with a probability of coupling a respective left expression, in the respective language, to the left of the respective test expression; and
   computing the respective probability value for the respective test expression by summing up the correlation value, the plurality of left entropy values and the plurality of right entropy values in a weighted manner.

4. The method of claim 1, wherein the subset of expressions are included in the first vocabulary sub-list, when each word in the subset of expressions is included in the first vocabulary list, but not in the second vocabulary list.

5. The method of claim 1, wherein determining that, in the information content, the total frequency of occurrence for the subset of expressions meets the predetermined occurrence criteria, based on at least one parameter among the number of words in the subset of expressions, a first ratio between the number of words in the subset of expressions and the total number of words in the information content, and a second ratio between the number of words in the subset of expressions and the number of words in another subset of expressions, included in the information content, that are defined as valid vocabulary.

6. The method of claim 1, wherein the total frequency of occurrence for the subset of expressions is determined to meet the predetermined occurrence criteria, when the number of words in the subset of expressions exceeds a threshold number.

7. The method of claim 1, wherein the total frequency of occurrence for the subset of expressions is determined to meet the predetermined occurrence criteria, when a ratio between the number of words in the subset of expressions and the total number of words in the information content exceed a first threshold ratio.

8. The method of claim 1, wherein the frequency of occurrence for the subset of expressions is determined to meet the predetermined occurrence criteria, when a ratio between the number of words in the subset of expressions and the number of words in another subset of expressions, included in the information content, that are defined as valid vocabulary exceeds a second threshold ratio.

9. The method of claim 1, wherein determining that, in the information content, the total frequency of occurrence for the subset of expressions meets the predetermined occurrence criteria, further comprising:
   computing the number of words in the subset of expressions that are specifically associated with the first language;
   computing a first ratio between the number of words in the subset of expressions and the total number of words in the information content;
   computing a second ratio between the number of words in the subset of expressions and the number of words in another subset of expressions, included in the information content, that are defined as valid vocabulary;
   calculating a weighted sum of the number of words in the subset of expressions, the first ratio and the second ratio; and
   determining that the weighted sum exceeds a predetermined threshold value.

10. The method of claim 1, wherein the first and second languages are two distinct Chinese dialects, and wherein identifying the plurality of expressions, within the information content, that are included in the comprehensive vocabulary list, further comprises:
   segmenting the information content to the plurality of expressions in accordance with the comprehensive vocabulary list.

11. The method of claim 1, wherein the first and second languages are two distinct languages selected from a language group that consists of British English, American English and Australian English.

12. The method of claim 1, wherein the second vocabulary list is analyzed in view of the first vocabulary list to identify a second vocabulary sub-list, in the comprehensive vocabulary list, that is used in the second language, but not in the first language, the subset of expressions in the plurality of expressions comprising a first subset of expressions, the total frequency of occurrence comprising a first frequency of occurrence, the method further comprising:
   identifying a second subset of expressions, in the plurality of expressions, that are specifically associated with the second language and included in the second vocabulary sub-list;
   determining, in the information content, a second frequency of occurrence for the second subset of expressions; and
   determining a primary language used by the information content according to a comparison between the first frequency of occurrence and the second frequency of occurrence.

13. The method of claim 1, wherein the first vocabulary list and the second vocabulary list are analyzed to identify a mixed vocabulary sub-list and a second vocabulary sub-list in the comprehensive vocabulary list, the mixed vocabulary sub-list being used in both the first and second languages, the second vocabulary sub-list being used in the second language, but not in the first language, the total frequency of occurrence comprising a first frequency of occurrence, the method further comprising:
   determining, in the information content, a second frequency of occurrence for expressions included in the second vocabulary sub-list;
   determining, in the information content, a mixed frequency of occurrence for expressions included in the mixed vocabulary sub-list; and
   determining a primary language used by the information content based on the first frequency of occurrence, the second frequency of occurrence and the mixed frequency of occurrence.

14. A computer system, comprising:
one or more processors; and
memory having instructions stored thereon, which when executed by the one or more processors cause the processors to perform operations, the operations including:
   integrating a first vocabulary list and a second vocabulary list that are built based on a first language and a second language, respectively, into a comprehensive vocabulary list, wherein the integrating includes analyzing the first vocabulary list in view of the second vocabulary list to at least identify a first vocabulary sub-list, in the comprehensive vocabulary list, that is used in the first language, but not in the second language;
   identifying, within the information content, a plurality of expressions that are included in the comprehensive vocabulary list;
   identifying, within the plurality of expressions, a subset of expressions that are included in the first vocabulary sub-list;
   determining that a total frequency of occurrence of the subset of expressions within the information content meets predetermined occurrence criteria; and
   in accordance with the determination, determining that the information content is composed in the first language.

15. The computer system of claim 14, wherein building the first vocabulary list and the second vocabulary list, further comprising:
   creating the respective vocabulary list for either one of the first language and the second language;
   identifying a plurality of test expressions in test information content corresponding to the respective language;
   after identifying, computing a respective probability value based on a frequency of occurrence for each of the plurality of test expressions; and when the respective probability value for each test expression exceeds a respective test threshold value, modifying the respective vocabulary list by incorporating the respective test expression.

16. The computer system of claim 14, wherein determining that, in the information content, the total frequency of occurrence for the subset of expressions meets the predetermined occurrence criteria, based on at least one parameter among the number of words in the subset of expressions, a first ratio between the number of words in the subset of expressions and the total number of words in the information content, and a second ratio between the number of words in the subset of expressions and the number of words in another subset of expressions, included in the information content, that are defined as valid vocabulary.

17. The computer system of claim 14, wherein the first and second languages are two distinct Chinese dialects, and wherein identifying the plurality of expressions, within the information content, that are included in the comprehensive vocabulary list, further comprises:
   segmenting the information content to the plurality of expressions in accordance with the comprehensive vocabulary list.

18. The computer system of claim 14, wherein the first vocabulary list and the second vocabulary list are analyzed to identify a mixed vocabulary sub-list and a second vocabulary sub-list in the comprehensive vocabulary list, the mixed vocabulary sub-list being used in both the first and second languages, the second vocabulary sub-list being used in the second language, but not in the first language, the total frequency of occurrence comprising a first frequency of occurrence, the method further comprising:
   determining, in the information content, a second frequency of occurrence for expressions included in the second vocabulary sub-list;
   determining, in the information content, a mixed frequency of occurrence for expressions included in the mixed vocabulary sub-list; and
   determining a primary language used by the information content based on the first frequency of occurrence, the second frequency of occurrence and the mixed frequency of occurrence.

19. A non-transitory computer-readable medium, having instructions stored thereon, which when executed by one or more processors cause the processors to perform operations, the operations including:
   integrating a first vocabulary list and a second vocabulary list that are built based on a first language and a second language, respectively, into a comprehensive vocabulary list, wherein the integrating includes analyzing the first vocabulary list in view of the second vocabulary list to at least identify a first vocabulary sub-list, in the comprehensive vocabulary list, that is used in the first language, but not in the second language;
   identifying, within the information content, a plurality of expressions that are included in the comprehensive vocabulary list;
   identifying, within the plurality of expressions, a subset of expressions that are included in the first vocabulary sub-list;
   determining that a total frequency of occurrence of the subset of expressions within the information content meets predetermined occurrence criteria; and
   in accordance with the determination, determining that the information content is composed in the first language.

20. The non-transitory computer-readable medium of claim 19, wherein building the first vocabulary list and the second vocabulary list, further comprising:
   creating the respective vocabulary list for either one of the first language and the second language;
   identifying a plurality of test expressions in test information content corresponding to the respective language;
   after identifying, computing a respective probability value based on a frequency of occurrence for each of the plurality of test expressions; and
   when the respective probability value for each test expression exceeds a respective test threshold value, modifying the respective vocabulary list by incorporating the respective test expression.

\* \* \* \* \*